(12) United States Patent
Starr et al.

(10) Patent No.: US 11,874,676 B2
(45) Date of Patent: Jan. 16, 2024

(54) COOPERATIVE UNMANNED AUTONOMOUS AERIAL VEHICLES FOR POWER GRID INSPECTION AND MANAGEMENT

(71) Applicant: JAR Scientific LLC, West Mifflin, PA (US)

(72) Inventors: Justin Starr, Baden, PA (US); Ashish Basuray, Petaluma, CA (US); Roman Kazantsev, Fremont, CA (US)

(73) Assignee: JAR Scientific, LLC, West Mifflin, PA (US)

( * ) Notice: Subject to any disclaimer, the term of this patent is extended or adjusted under 35 U.S.C. 154(b) by 360 days.

(21) Appl. No.: 17/100,832

(22) Filed: Nov. 21, 2020

(65) Prior Publication Data

US 2021/0173414 A1  Jun. 10, 2021

Related U.S. Application Data

(60) Provisional application No. 62/939,205, filed on Nov. 22, 2019.

(51) Int. Cl.
*G05D 1/10* (2006.01)
*G08G 5/04* (2006.01)
(Continued)

(52) U.S. Cl.
CPC .............. *G05D 1/104* (2013.01); *B60L 58/12* (2019.02); *B64C 39/024* (2013.01); *B64D 1/16* (2013.01);
(Continued)

(58) Field of Classification Search
CPC ...... G05D 1/104; G05D 1/0094; G05D 1/106; B60L 58/12; B60L 2200/10; B60L 2240/622; B64C 39/024; B64D 1/16; B64D 9/00; B64D 47/08; B64F 1/362; G01S 19/45; G06F 18/25; G06V 10/764; G06V 10/82; G06V 20/10; G06V 20/13; G06V 20/17; G06V 20/176; G06V 20/52; G06V 40/10; G06V 2201/08; G08G 5/0043; G08G 5/02; G08G 5/045; G08G 5/0008; G08G 5/0013; G08G 5/0052; G08G 5/0069; G08G 5/0086; G08G 5/0021; B64U 10/13; B64U 50/19; B64U 2101/30; B64U 2201/10; B64U 2101/00; Y02T 10/72; Y02T 10/70; Y02T 90/16
(Continued)

(56) References Cited

U.S. PATENT DOCUMENTS 9,650,136 B1 * 5/2017 Haskin .................. B64U 10/13
9,849,978 B1 * 12/2017 Carmack ................ G01C 21/20
(Continued)

FOREIGN PATENT DOCUMENTS

WO  WO-2017090040  *  6/2017

*Primary Examiner* — Muhammad Shafi
(74) *Attorney, Agent, or Firm* — Gabriel & Co; Andrew M. Gabriel (57) ABSTRACT

An embodiment provides unmanned aerial vehicles (UAVs) for infrastructure surveillance and monitoring. One example includes monitoring power grid components such as high voltage power lines. The UAVs may coordinate, for example using swarm behavior, and be controlled via a platform system. Other embodiments are described and claimed.

20 Claims, 7 Drawing Sheets

(51) Int. Cl.
| | |
|---|---|
| G08G 5/00 | (2006.01) |
| B64C 39/02 | (2023.01) |
| B64D 9/00 | (2006.01) |
| B64D 47/08 | (2006.01) |
| B64D 1/16 | (2006.01) |
| B64F 1/36 | (2017.01) |
| B60L 58/12 | (2019.01) |
| G05D 1/00 | (2006.01) |
| G01S 19/45 | (2010.01) |
| G08G 5/02 | (2006.01) |
| G06V 20/52 | (2022.01) |
| G06V 20/10 | (2022.01) |
| G06F 18/25 | (2023.01) |
| G06V 10/764 | (2022.01) |
| G06V 10/82 | (2022.01) |
| G06V 20/13 | (2022.01) |
| G06V 20/17 | (2022.01) |
| G06V 40/10 | (2022.01) |
| B64U 10/13 | (2023.01) |
| B64U 50/19 | (2023.01) |
| B64U 101/30 | (2023.01) |

(52) U.S. Cl.
CPC ............... *B64D 9/00* (2013.01); *B64D 47/08* (2013.01); *B64F 1/362* (2013.01); *G01S 19/45* (2013.01); *G05D 1/0094* (2013.01); *G05D 1/106* (2019.05); *G06F 18/25* (2023.01); *G06V 10/764* (2022.01); *G06V 10/82* (2022.01); *G06V 20/10* (2022.01); *G06V 20/13* (2022.01); *G06V 20/17* (2022.01); *G06V 20/176* (2022.01); *G06V 20/52* (2022.01); *G08G 5/0043* (2013.01); *G08G 5/02* (2013.01); *G08G 5/045* (2013.01); *B60L 2200/10* (2013.01); *B64U 10/13* (2023.01); *B64U 50/19* (2023.01); *B64U 2101/30* (2023.01); *B64U 2201/10* (2023.01); *G06V 40/10* (2022.01); *G06V 2201/08* (2022.01)

(58) Field of Classification Search
USPC .......................................................... 701/16
See application file for complete search history.

(56) References Cited

U.S. PATENT DOCUMENTS

| | | | |
|---|---|---|---|
| 10,466,700 B1* | 11/2019 | Carmack | G08G 5/0069 |
| 2016/0253907 A1* | 9/2016 | Taveira | G08G 5/0039 |
| | | | 701/3 |
| 2019/0324478 A1* | 10/2019 | Lin | B64C 19/00 |
| 2019/0339081 A1* | 11/2019 | Malhotra | G06T 1/00 |
| 2019/0347924 A1* | 11/2019 | Trundle | H04B 7/18504 |
| 2019/0373173 A1* | 12/2019 | Wang | H04N 23/65 |
| 2021/0206488 A1* | 7/2021 | Yi | B64C 39/024 |
| 2021/0335123 A1* | 10/2021 | Trundle | B64C 39/024 |

* cited by examiner

COOPERATIVE UNMANNED AUTONOMOUS AERIAL VEHICLES FOR POWER GRID INSPECTION AND MANAGEMENT

CROSS-REFERENCE TO RELATED APPLICATIONS

This application claims priority to U.S. provisional patent application Ser. No. 62/939,205, filed Nov. 22, 2019, the contents of which are incorporated by reference herein in their entirety.

FIELD OF THE DISCLOSURE

The disclosure relates to systems and methods for aircraft systems task processing in a physical environment. Specifically, the disclosure is directed to cooperative autonomous unmanned aerial vehicles (UAVs) for recognition of objects.

BACKGROUND OF THE DISCLOSURE

The United States electrical power grid, with corresponding high- and low-power transmission and distribution lines, are a critical and central piece of the national infrastructure. The aging infrastructure, much of which was built in the 1950s and 1960s were not designed to support current electrical loads, nor survive the extreme weather events in recent decades. In 2017, the American Society of Civil Engineers gave the entire US energy infrastructure a barely passing grade of D+.

Recent analysis indicates that it would cost approximately $4.8 trillion to replace the entire US power grid; more specifically focusing on replacing the transmission and distribution subset of costing around $2.1 trillion. Cost estimates of these magnitudes make it challenging to perform comprehensive upgrades, and thus a more step-wise approach for infrastructure redevelopment is more practical and achievable. As upgrades to the transmission and distribution systems occur, stop-gap measures are needed to monitor the existing aging power grid.

Hardening the US power grid is another key initiative that encompasses damage prevention caused by weather and fire, service survivability in the event of a disaster, rapid recovery of power infrastructure, and grid modernization. Specifically, vegetation management is a major component of hardening for extreme weather. Periodic tree trimming is vital to mitigation of fire risk, minimizing the effects of winds and winter storms on power lines. Much of the power grid is in remote and low population density areas, making routine inspection and maintenance difficult. Strategies to routinely and continuously monitor vegetation adjacent to transmission power lines serves to harden the power grid, providing data to prevent infrastructural failure.

In addition to weather causing electrical grid failure, which may result in fires, electric overload is a challenge of an aging power grid. Increasing demand on the existing transmission and distribution lines, combined with distribution lines that are now inputs for renewable power, i.e., solar, wind, geothermal, etc., the probability of overloading high-traffic power lines increases. Electric overload results in heat, melting of wires and possibly fire. Strategies to detect aberrant power loads through electromagnetic frequencies (EMF) in transmission and distribution lines mitigates the risk of electric overload.

SUMMARY OF THE DISCLOSURE

In summary, an embodiment includes a collection of one or more autonomous unmanned aerial vehicles (UAVs) comprised of self-propelled aerial vehicles, with modular payload attachment systems, sensor packages, and processors internetworked together with the sensor packages; said sensor components comprising of visual cameras, light detection and ranging (LIDAR) sensors, acoustic sensors, and electromagnetic field sensors or sensor arrays, geographic positioning system (GPS/GLONASS) receivers; said processors comprising of a central processing unit and one or more graphics processing units configured to collect data visual image data for use in navigation, associate the LIDAR data, visual image data and electromagnetic field data to identify and classify the condition of objects, and communicate this data over a network connection to coordinate the actions of several UAVs in the field.

Another embodiment comprises operating a collection of autonomous unmanned aerial vehicles to obtain sensor data for its surrounding environments, analyzing, using a processor, the sensor data using a trained model, wherein the trained model is trained using a dataset including sensor data of objects and one or more of: visual image data of objects, GPS data, LIDAR point clouds of objects, acoustic data, infrared data, and electromagnetic field data indicating encroachment or obstruction of power lines; performing one or more of: identifying, using a processor, a type of data including EMF strengths; selecting, using a processor, a strategy for action or communicating effectively; and executing the strategy to decompose complex high level tasks into a collection of instructions for individual or groups of UAVs.

Another embodiment includes a method for operating a collection of autonomous unmanned aerial vehicles to obtain sensor data for the surrounding environments; analyzing, using a processor, the sensor data using a trained model, wherein the trained model is trained using one or more of path planning algorithms, GPS data, LIDAR point clouds; performing one or more of: identifying, using a processor, a type of path for effectively navigating to objects for purposes of sensor data collection or live data communication to other UAVs or locations for recommended interventions and identifying a high-level task strategy for data collection on objects, and dissemination of commands to a collective of UAVs; and moving the UAV using the path and flight strategy to identify and inspect the object.

In another embodiment, a method for interacting with an end user to capture inputs such as requested behaviors, storing those inputs in a database, transmitting those inputs to one or more UAVs and displaying any data collected in response to those inputs on an output device; the method consisting of a combination of hardware and software operating on a local or distributed computing infrastructure, and communicating with UAVs over a networking system The foregoing is a summary and thus may contain simplifications, generalizations, and omissions of detail; consequently, those skilled in the art will appreciate that the summary is illustrative only and is not intended to be in any way limiting.

For a better understanding of the claimed embodiments, reference is made to the following description and the accompanying drawings.

DETAILED DESCRIPTION OF THE EMBODIMENTS

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

As used in this application, the terms "component," "system," "subsystem," "platform," "controller," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer.

By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application.

As yet another example, a component can be an apparatus that provides specific functionality through electronic components without mechanical parts, the electronic components can include a processor therein to execute software or firmware that provides at least in part the functionality of the electronic components.

As further yet another example, interface(s) can include input/output (I/O) components as well as associated processor, application, or Application Programming Interface (API) components.

While the foregoing examples are directed to aspects of a component, the exemplified aspects or features also apply to a system, platform, interface, controller, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of modules refers to one or more modules.

The terms "a" or "an', as used herein, are defined as one or more than one. The term plurality, as used herein, is defined as two or more than two. The term "another", as used herein, is defined as at least a second or more. The terms "including" and "having," as used herein, are defined as comprising (i.e., open language). The term "coupled', as used herein, is defined as connected, although not necessarily directly, and not necessarily mechanically.

Various aspects or features will be presented in terms of systems that can include a number of devices, components, modules, and the like. It is to be understood and appreciated that the various systems can include additional devices, components, modules, etc. and/or may not include all of the devices, components, modules etc., discussed in connection with the figures. A combination of these approaches also can be used.

The American Society of Civil Engineers (ASCE) maintains records on major United States infrastructure, including the electrical grid. In a 2017 report, the agency determined the majority of electrical 640,000 miles of high-voltage transmission lines in the lower 48 states are at full capacity. In addition many transmission lines were constructed in the 1950s and 1960s with a 50-year life expectancy, and not designed to meet current demand or severe weather events. As a result, in 2015, due to aging infrastructure, severe weather events, and attacks and vandalism, in 2015 Americans experienced a reported 3,571 total outages, with an average duration of 49 minutes. Between 2003 and 2012, weather-related outages, coupled with aging infrastructure, are estimated to have cost the U.S. economy an inflation-adjusted annual average of $18 billion to $33 billion and significantly increase the risk of accidental and non-accidental deaths. In addition, power companies aging infrastructure has directly led to wildfires costing human lives and billions of dollars in damages. One strategy to assuage the deteriorating electrical infrastructure is the use of remote sensing and inspection autonomous aerial vehicles (UAVs) to lower the cost of energy system monitoring and increased focus on remote and high-risk regions.

Rapid and continuous monitoring are two important factors in transmission line inspection. Often, many of the highest risk locations for aging transmission lines to fail are in remote and underserved areas. When natural events, i.e., high winds, fallen trees or branches impact transmission lines in remote areas, the resulting fire or power outage is only noted after the event. Lack of proper sensing and continuous monitoring compounds the event's impact due to delayed response. For example, with continuous monitoring, a fire started by a fallen branch could be contained quickly versus loss of containment and rapid conflagration towards population centers.

A network of unmanned autonomous aerial vehicles (UAVs) with onboard sensor packages would serve to provide continuous, unmanned surveillance of transmission and distribution electrical infrastructure. The system would consist of both UAVs operating continuously in order to perform inspections, as well as stationary docking stations mounted on, along, adjacent to, or nearby transmission lines, providing real-time data through communication networks to prevent failure and identify potential hazards.

Figure 1:
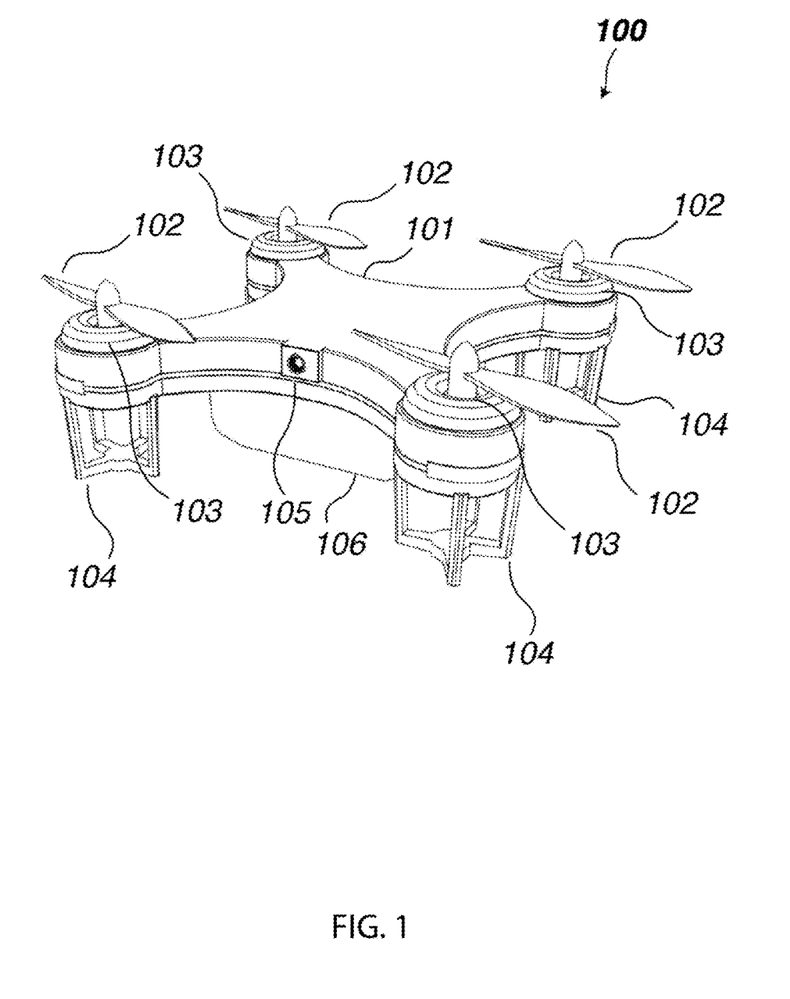
FIG. 1 depicts an example of an autonomous unmanned vehicle of the disclosure including one or more sensors.

FIG. 1 illustrates an example of an unmanned autonomous aerial vehicle (UAV) for power line monitoring 100. UAV 100 is an integrated system, combining a body 101, a self-propelled propulsion system 102, a motor assembly, and power supply 103, a landing system 104, a visual senor package 105, and bottom-mounted sensor package 106, with communications antenna 106, modular payload attachment system 106, and a processor control module 106. The UAV can be a single standalone unit, or it can interface with other locally available UAV 100 units to form a system capable of dividing units of work, collaborating on tasks or adding additional information to models of the environment or state.

UAV 100 may be embodied with an array of options to customize functionality for a particular task. In an embodiment, the UAV with a body 101 supporting four independent propellers 102 with motor assemblies and lithium ion battery power sources 103. Each propeller and motor assembly would operate interdependently enabling unmanned flight along three dimensions, as well as maintaining stationary position, while accounting and adjusting for variables such as oscillating wind speeds.

The example illustrated in FIG. 1 uses the body of an UAV; however other embodiments of the body may be substituted. The design of the body 101 may be constructed to remember a helicopter body, an aeroplane body or a high-altitude balloon basket. Similarly, the example illustrated in FIG. 1 uses propellers 102 and battery-powered motorbox 103 for locomotion; however other embodiments of conveyance may be substituted. The locomotion may include designs that resemble single rotor propeller, similar to helicopters, multi engine designs, similar to aeroplanes, UAVs with buoyancy provided by elements lighter than atmosphere, i.e., helium, with navigational thrusters, similar to a high altitude balloon. The use of one or more engines, which may be propeller or jet-powered, ensure operation in non-hospitable environments with a greater range. Fuel sources could include solar panels, batteries or hydrocarbons and any combination thereof.

Figure 2:
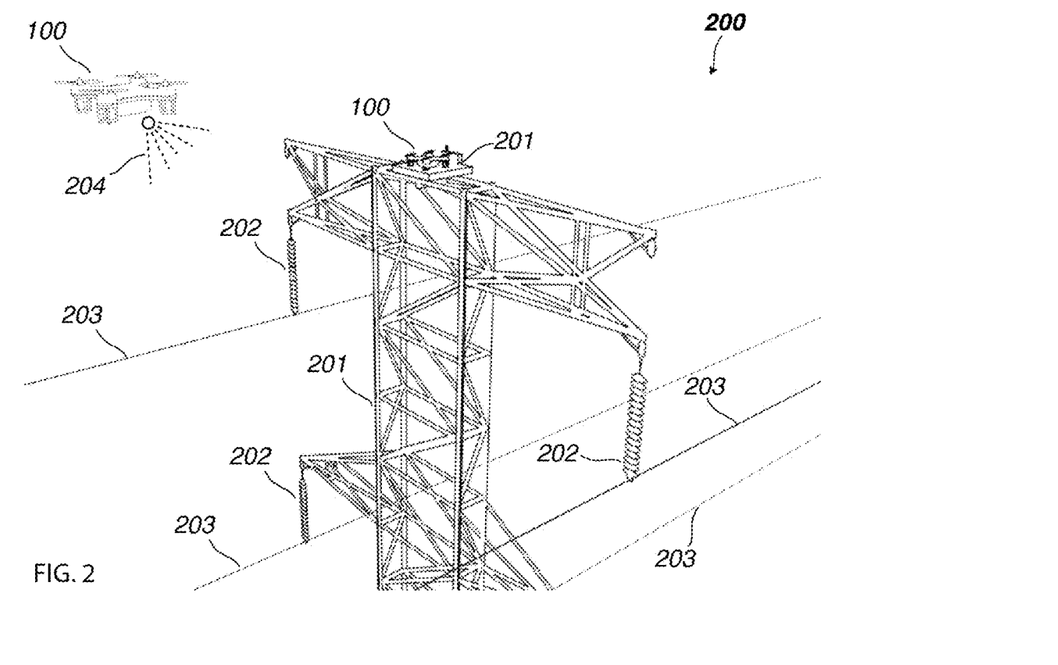
FIG. 2 depicts an example of autonomous unmanned vehicle scanning a transmission line tower and landing at a docking station to charge and upload data.

FIG. 2 illustrates a UAV 100 interacting with a high voltage transmission and distribution power line 200. In this illustration, the UAV 100 has a resting dock 201 on the scaffolding of the power line. The resting dock 201 is insulated from the high voltage lines 203 by insulating coils 202. Low voltage power would be transformed from the high voltage lines 203 that powers the resting dock 201. The landing system on the UAV 104 may be constructed to interact with the resting dock 201 with an electromagnetically actuated lock that creates a secure dock. The secure resting dock 201 provides power and enables data transfer from visual 105 and non-visual 106 sensor packages to the resting dock's local data storage and data processor. The resting dock 201 may be designed with a communication device to connect to both the UAV 100 as well as a cloud-based platform. The communication may occur through protocols including radio, Bluetooth, 3G, 4G, 5G, LTE. The resting dock 201 may interact with UAV 100 while docked or within communication range.

Figure 5:
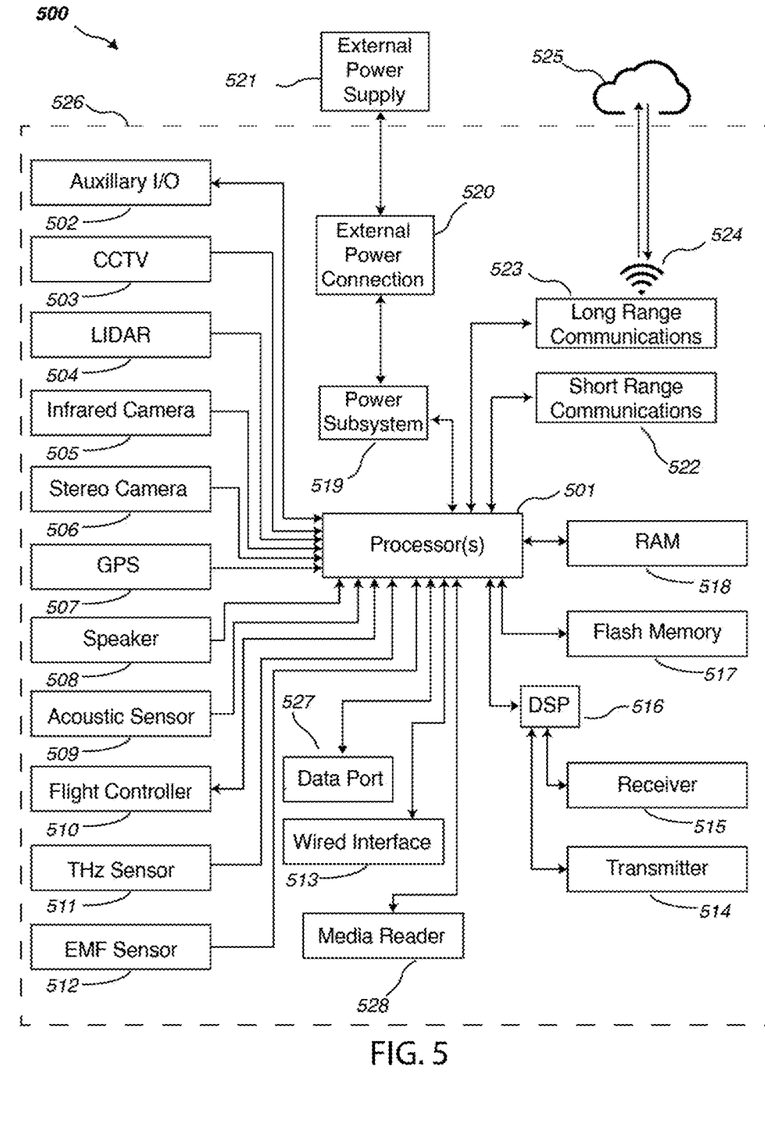
FIG. 5 depicts an example of a circuit flow diagram of processors, sensors, communication, memory, and power subsystems suitable for use in an autonomous unmanned vehicle.

The UAV's 100 onboard sensor packages 105 and 106 enable the autonomous behavior and complete task objectives. Sensors on the UAV include traditional remote sensing and navigation sensors, including CCTV 503, stereo cameras 506, multispectral imaging, LIDAR 504, acoustic/sonar 509, GPS/GNSS 507, etc. A number of sensors specific to power line inspection could also be included, such as electromagnetic field detectors 512, RF signature analyzers, Hall effect sensors, magnetometers and more. The combined fusion of data from these sensors enables the UAV to successfully navigate in the three-dimensional world, as well as track and follow transmission lines 204.

The UAVs shall also contain systems designed to protect the environment in the event of total or partial system failure. These systems could include automatic landing functions, normally open electromagnets designed to physically repel EMF to avoid collision with power lines, chemical material that can render an embedded lithium battery inert and prevent a thermal runaway, automatic transmission of a telemetry beacon to enable rapid recovery, automatic deployment of fireproof expanding foam to encapsulate any thermal event or other processes. These processes could be deployed by software when the integrated processor detects a loss of control event, or they could be hardwired and trigger upon contact, impact, or a remotely actuated signal.

Figure 3:
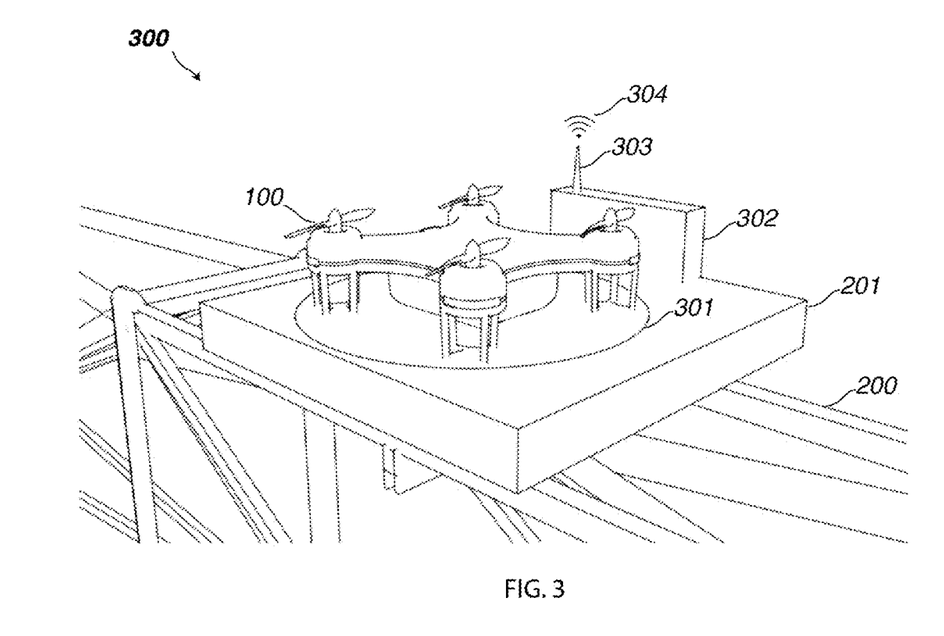
FIG. 3 depicts an example of autonomous unmanned vehicle docking station with a data processing and communication resources.

The UAVs in the system shall dock at various secure "docking stations" located throughout the system. FIG. 3 shows an example of such a UAV docking station 300, consisting of docking station base platform 201, UAV locking and charging pad 301, data processing unit 302, and communication antenna 303 for data transmission 304 to cloud-based servers and UAV units. A docking station can be defined as a location that secures the UAV in place and provides a power and data connection. Docking stations may be located at the top of transmission lines 200, in power cuts, at substations, on rooftops or anywhere easily accessible from the transmission system. The docking stations feature a homing mechanism that will enable the UAV to land on the desired location, an electromagnetic lock, that uses a combination of electronic signals and mechanical actuation to secure the UAV in place, electrical connections to charge batteries, and data connections to download data from the UAV. An integrated antenna 304 enables the transmission of data to a central location for subsequent analysis.

The locking mechanism of the docking station may serve multiple functions: first, it is designed to secure the UAV against inadvertent motion—ensuring that wind gusts, rain or even motion prevent the UAV from disconnecting from the base. Second, it is designed to secure the UAV against malicious tampering. Individuals seeking to remove the UAV from the lock, will be unable to do so without physically damaging the asset. Sensor data 503-512 may be recorded from any attempts in an effort to track down the would-be thief. When docking stations are located adjacent to the transmission system 200, power can easily be supplied to the docking station. In other locations, the docking stations must be independently powered. Docking stations are capable of reporting the charging status of attached UAVs to a central location, so the system knows how much capacity is available at each docking station, and when new charging/download slots will become available.

While the individual UAV has novel features that extend the capabilities of state-of-the-art UAVs, the invention further encompasses the idea of one or more of these aerial platforms working as an interconnected system, or swarm that is capable of adapting in real-time to changing conditions. This combination of hardware and software functions akin to a digital organism or network, where resources can be allocated in the service of complex tasks.

This organism relies on a software infrastructure platform that monitors and records the positions of any UAV in the system at any time, updating at a predetermined interval. The UAV position is recorded relative to a coordinate system, such as state or national planes, and relative to the infrastructure that is the object of inspection—including, but not limited to, electrical transmission lines, electrical distribution lines, towers and support structures, transformers, interconnects, or docking locations, airports and air strips, and other units of relevant infrastructure.

Figure 4:
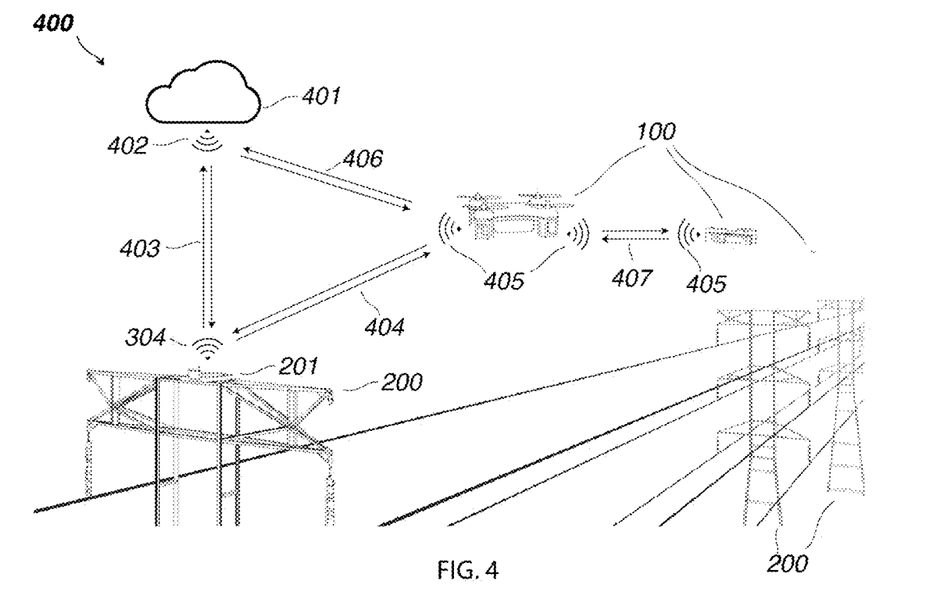
FIG. 4 depicts an example of how data is transmitted from a cloud-based server to the UAV swarm either directly or via the docking station.

FIG. 4 describes the swarm communication system 400. This system is comprised of a cloud-based server 401, cloud communication protocol 402, UAV docking station 201 communication system 304, and UAV 100 based communication systems 405. Tasks to be completed by the UAV swarm may be routed from the cloud-based server 401 to any of the following, i) cloud-based server to UAV 406, ii) from cloud-based server through docking station 403 to UAV 404, iii) between two UAVs 407, etc.

The software framework may change the UAV behavior en masse depending on overall conditions. An embodiment of the communication system 400 may occur wherein UAVs could be performing inspections as the default behavior, but when a disaster is detected, the system could reallocate UAVs using different prioritization. For example, UAVs may swarm to the area of the disaster and perform continuous surveillance to direct and inform emergency responders with real-time data. UAVs could also perform a coordinated retreat if a disaster is spreading in order to preserve assets and increase safety. In an extreme example, if a small isolated events were detected, nearby UAVs could sacrifice themselves by crashing into the area and deploying their fire suppression technology, if so equipped. The cloud software 401 is designed to provide a user friendly interface and method of administering the system that connects and manages the body of UAVs. It may encompass back end components—database systems tracking UAVs and data they are collecting—as well a front end that displays results to an end user and enables them to input tasks or commands. The databases could be broken down into two main groups—a UAV database that monitors the state of every UAV in the system—location, health, current assignment, etc. and an inspection database that serves as a repository for collected data. The databases could be relational and use systems like SQL, or could have non-relational components, perhaps when storing large quantities of video data.

In another example of the communication system 400, when an inspection task is entered, the system may communicate with the network of UAVs bidirectionally 407 in order to update inspection plans per information coming from the UAVs. For example, if UAVs are unable to begin a task due to weather, the system could extend completion time accordingly. Further, if the UAVs are logging data and indicating that tasks are complete, the system could automatically redeploy them to new locations. The system can also suggest modifications to the inspection task automatically if data or heuristics suggest a user error or nonoptimal command.

FIG. 5 is a block diagram of the electrical UAV control and communications device 500 comprising an external power supply 521, a cloud-based server and memory storage system 525, and an electronic device 526 customized for the use by UAV 100. UAV 100 may include one or all of the components of device 526. This includes but is not limited to a processor package 501 comprising at least one central processing unit (CPU) and at least one graphics processing unit (GPU). The device 526 may include one or more of the following components, and there may be one or more of each such component: a series of auxiliary input and output (I/O) ports 502, a CCTV camera 503, a light detection and ranging (LIDAR) sensor 504, an infrared camera 505, a stereo camera 506, a global positioning sensor (GPS) unit 507, a speaker 508, an acoustic sensor 509, a flight controller 510, a terahertz (THz) sensor 511, an electromagnetic frequency (EMF) sensor 512, a wired interface 513, a wireless digital signal transmitter 514, a wireless digital signal receiver 515, a digital signal processing (DSP) unit 516, a flash memory storage unit 517, a random access memory (RAM) unit 518, a power subsystem unit 519, an external power connection 520, a short-range communication subsystem unit 522, a long-range communication subsystem unit 523, a data port 527, and an external media reader 528. Electronic device 526 is connected powered via an external power supply 521 and interacts with a cloud-based server and memory storage system 525 by sending wireless signals 524 via a long-range communication subsystem unit 523. In this example, an electronic device 526 is processor and sensor package capable of creating a 3D map of UAV 100's location in space. For example, for a given received task, UAV 100 uses processors 501, on-board sensors 503-512, and wireless communication resources to construct a task list and a map of where to go. More detailed information on how these inputs are received and integrated is provided in the discussion of FIG. 6 and FIG. 7.

Sensors 503-512 may be located in sensor packages at the front 105 and bottom 106 of UAV 100 provide information about the surrounding environment by sending digital signals to GPU/CPU processor package 501 via DSP unit 516. Communication systems 522-523 enable the UAV to interact via device 526, with both direct controllers, an autonomous, cloud-based swarm of other components within device 526 as shown in FIG. 5, or other assets capable of radio communication. Sensors identified in FIG. 5 and otherwise may include spinning or solid-state LIDAR, closed-circuit television cameras, stereo cameras, infrared cameras, terahertz sensors, temperature and humidity sensors, gyroscopes and IMUs, magnetometers, and other devices. The embodiment seen in FIG. 1 shows a sensor package localized at the bottom of the UAV, but sensors may be distributed in a larger number of locations throughout the UAV in order to optimize performance.

Sensors are connected to the larger swarm and cloud system via a well-defined high-speed network. Electronic device 526 incorporates communication subsystem elements such as a wireless transmitter 514, a wireless receiver 515, and associated components such as one or more short and long range communication antenna elements 522 and 523, respectively. A digital signal processor (DSP) 516 performs processing to extract data from received wireless signals and to generate signals to be transmitted. The particular design of the communication subsystem is dependent upon the communication network and associated wireless communications protocols with which the device is intended to operate. Examples of suitable communication systems include Wi-Fi, Zigbee, 3G/4G/5G cellular, Satellite, short-wave radio, and the like. Software defined radios allow the robot to dynamically alter radio communications systems depending on regulatory and operational needs in a specific environment.

The electronic device 526 may include a CPU/GPU processor package 501 (as well as other processing units such as graphics processing units GPUs) that controls the overall operation of the electronic device 526. The processor 501 may interact with the above described communications subsystem elements and also interacts with other device subsystems such as flash memory 517, random access memory (RAM) 518, auxiliary input/output (I/O) device 502, speaker 510, keyboard 511, display(s) 512, a power subsystem 519, and any other device subsystems.

A power subsystem 519 may provide power to the circuits of the electronic device 526. Processor and sensor state data could be stored in non-volatile flash memory 517, so no battery power storage is required to preserve state information. The power subsystem may be connected to an external power connection 520, which could then be fed electrical power from an external power supply 521.

The data port 527 may be an interface across which electrical and optical data communications are sent to or received from electrical device 526. The data port 527 may support data communications between the electronic device 526 and other devices through various modes of data communications, such as high speed data transfers over an optical communications circuits or over electrical data communications circuits such as a universal serial bus (USB). Data communication through data port 527 may enable a user to set preferences through an external device or through a software application and extends the capabilities of the device by enabling information or software exchange through direct connections between the electronic device 526 and external data sources rather than via a wireless data communication network.

Operating system software used by the microprocessor 501 may be stored in flash memory 517. The operating system software, device application software, or parts thereof, are temporarily loaded into volatile data storage such as RAM 518. Data received via wireless communication signals or through wired communications may be stored to RAM 518.

The processors 501, in addition to its operating system functions, may execute software applications on the electronic device 526. A predetermined set of applications that control basic device operations, that may include i) least path finding, ii) object detection, iii) object manipulation, and iv) communication with external resources, etc. are installed on the electronic device 526 during manufacture or at another time. Examples of applications that are loaded onto the device are related object detection of specific items, object avoidance protocols, or communication with specific information systems.

Further applications may also be loaded onto the electronic device 526 through, for example, the short- or long-range communication systems 522 and 523, respectively, an auxiliary I/O device 502, data port 527, or any combination of these interfaces. Such applications are then able to be installed by a user in the RAM 518 or a non-volatile store for execution by the microprocessor 501.

In a data communication mode, a received signal such as user instructions or data from an external resource may be processed by the communication subsystem, including wireless receiver 515 and wireless transmitter 514, and communicated data could be provided the CPU/GPU processor package 501. The processor package would then able to further process the received data for output to an auxiliary I/O device 502 or the data port 527.

In an embodiment, depending on conditions or statuses of the electronic device 526, one or more particular functions associated with a subsystem circuit are disabled, or an entire subsystem circuit is disabled. For example, if the system operating temperature is too low or too high for safe processor operation, then non-critical functionality, but data communications, such wireless or long-range communication, are still be enabled over the communication subsystem.

A short-range communications subsystem 522 may provide data communication between the electronic device 526 and different systems or devices, which need not necessarily be similar devices. For example, the short-range communications subsystem 522 includes an infrared device and associated circuits and components or a radio frequency-based communication module such as one supporting BLUETOOTH™ communications, to provide for communication with similarly-enabled systems and devices, including the data file transfer communications described above. A wired interface 513 is provided and configured to support any known wired communication protocol, for example USB.

A media reader 528 may be connected to an auxiliary I/O device 502 to allow, for example, loading computer readable program code of a computer program product into the electronic device 526 for storage into flash memory 517. One example of a media reader 528 is an optical drive such as a CD/DVD drive, which is used to store data to and read data from a computer readable medium or storage product such as computer readable storage media. Examples of suitable computer readable storage media include optical storage media such as a CD or DVD, magnetic media, or any other suitable data storage device. Alternatively, the media reader 528 may be connected to the electronic device through the data port 527 or computer readable program code may be provided to the electronic device 526 through the cloud-based network 525.

Various telemetry data from the UAVs shall also be updated by the infrastructure platform, so that the battery state, current draw, flight time, in service hours, motor speed asset age, and other characteristics will be known at all times. Using a set of predetermined or dynamically generated rules, UAVs can be scheduled for preplanned service or maintenance proactively, before a failure occurs. These rules could include, but are not limited to: airframe inspections after a predetermined number of flight hours, propeller inspections after a predetermined number of takeoff and landing cycles, battery replacement at fixed voltage thresholds, emergency service if anomalous current draws are detected, and other similar tasks.

With knowledge of the individual UAV locations, docking stations, telemetry and the geography of the power line system subject to inspection, the infrastructure platform can disperse the UAVs throughout the system in order to make condition assessments in its entirety according to a preset schedule. For example, if daily inspections are desired, the system can route UAVs throughout the network such that each stretch of transmission lines are covered by a sufficient number of UAVs to perform an inspection in the time allotted. The system can change dynamically to account for different types of inspections—for example, inspecting all towers on a line would take a different amount of time than assessing foliage impingement—and the number of UAVs required for an inspection would change accordingly.

The system extends this concept in order to provide a system for generally decomposing high-level complex tasks into component actions, enabling an end user to give directives and have the system automatically identify and execute the lower level actions that can synthesize a high-level task. More detail about this decomposing process is provided in the description of FIG. 6. The system may also analyze resources available and identify any gaps or needs that must be filled in order to accomplish the task. For example, if the end user directs the systems to inspect all transmission towers in a given corridor in the next eight hours, the system will automatically determine flight time, imaging and sensor requirements, allocate resources from the pool of UAVs, assign UAVs with specific tasks at specific towers and record data as it is gathered and reported back. If the system does not have enough UAVs to complete the task in the parameters specified, it will notify the end user that more resources are required, or enable the user to change parameters to match with the resources at hand—such as increasing the amount of time or reducing the inspection scope.

Figure 6:
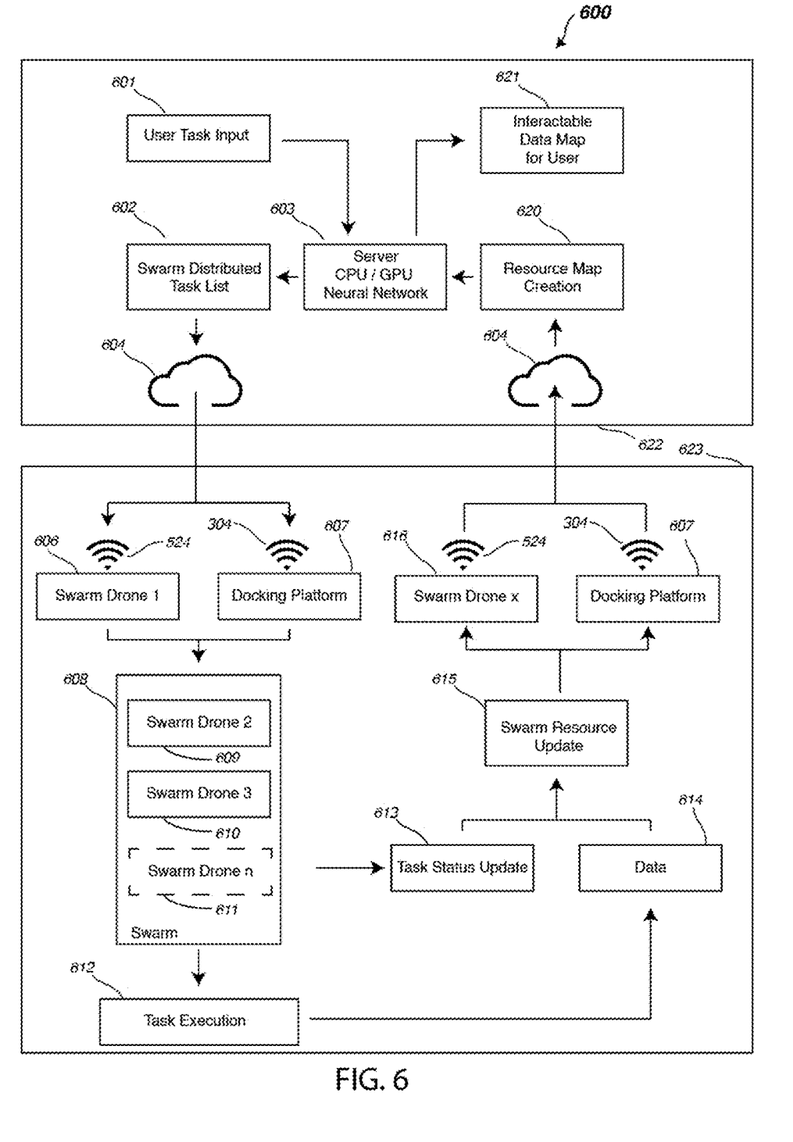
FIG. 6 depicts the decomposition of high-level, user inputted tasks into swarm distributed tasks that can be carried out by individual autonomous unmanned vehicles in the field.
Figure 7:
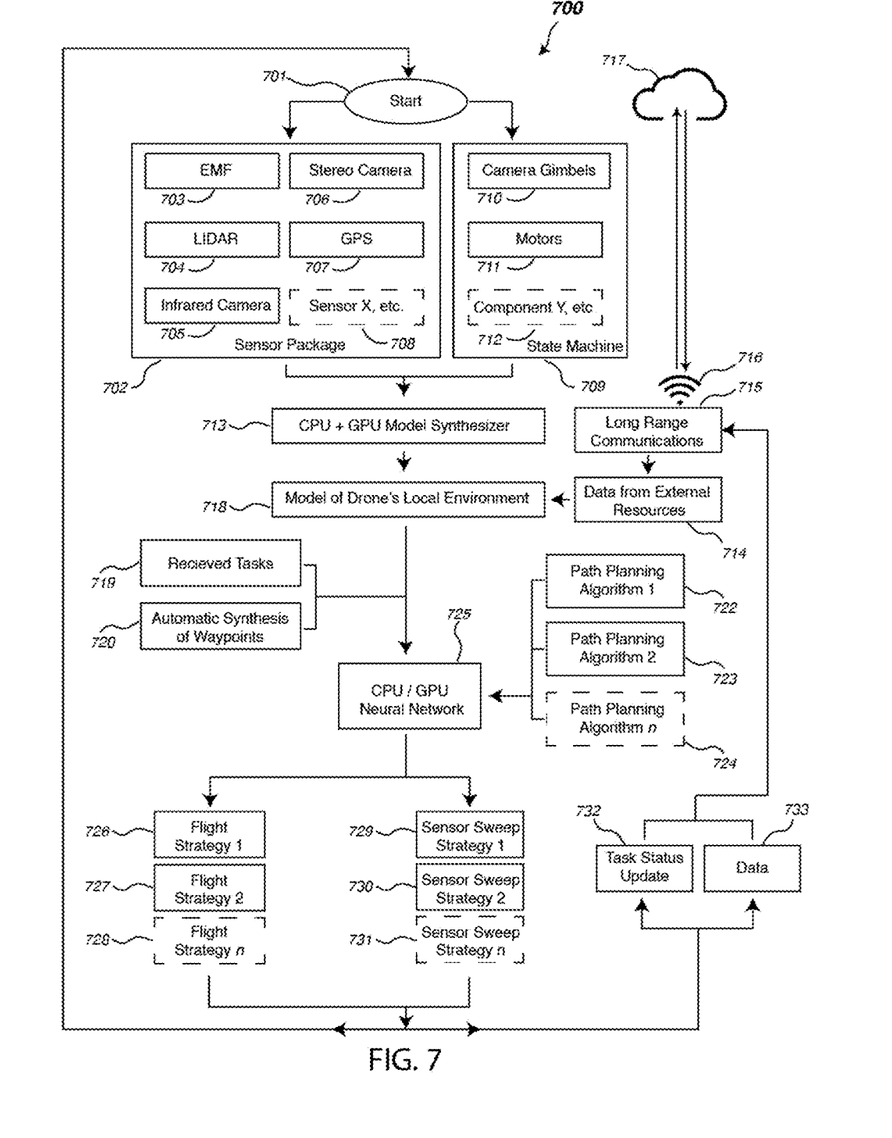
FIG. 7 depicts an example method for autonomous task completion, flight path planning, sensor sweep planning, and communication with external resources.

This framework also allows for the seamless input of UAVs 608 at any point on the system. Since UAVs can traverse all areas of the transmission network, inputting a new UAV into the network simply means finding an access point. Once processed 700, the software platform will give the UAV a course to an area of need and manage the traversal throughout network, docking at points along the way to charge or discharge. Similarly, damaged UAVs can work their way to a convenient exit point if they are capable of doing so, and the damage is detected before it is catastrophic.

FIG. 6 outlines an embodiment of process 600 for the communication between server-based resources 622 and field-deployed resources 623. Operations begin with the input of high-level user tasks 601 to the server-based CPU/GPU neural network 603. This algorithm computes an optimal way of executing user task 601 given the available resources in the field 620. This process may generate a swarm distributed task list that identifies which UAV 100 or groups of UAVs are best suited for which tasks. This information may then fed to the cloud-based communications system 604 and transmitted wirelessly to either an individual UAV in the swarm 606 via UAV communication system 524, or to the UAV docking platform 607 via the docking platform communication system 304. The task distributed list 602 is then transmitted to the UAV swarm 608 via the individual UAV 606 or the docking platform 607, thereby disseminating the task list to n UAVs in the swarm 609-611, where n can be at least 1, desirably at least 10, and preferably at least 25. The UAVs may then proceed to accomplish the specified task 612, whether that be visual inspection of cables, scanning vegetation around the power lines, or some other task not listed here. This task execution process results in the creation of a task status update 613 about the completion of the task, and data set 614 associated with task completion. The updated task list and dataset are bundled into a swarm resource update 615 via the UAV's onboard CPU/GPU processing unit 501. This bundled data can then be transmitted back to the cloud-based servers via an individual UAV x 616, where x is any individual UAV in the swarm containing n UAVs, communicating with the server directly via UAV communication system 524, or be transferred to the docking platform 607 first and then uploaded to the cloud via docking platform communication system 304. Once this dataset is received by the cloud-based communication system 604, the data may be used to update the map of available resources 620 and or used to synthesize an interactable data map 621 for users to see a visualized output of the UAV collected dataset. In another embodiment of 600, both 622 and 623 are located locally on UAV 100, with tasks being transmitted between UAVs 100, docking platforms 607 and other UAV swarms 606, 608.

The user interface for this software may show an end user the location of all UAVs overlaid on a map of their choosing using near real-time data. The user could zoom in or out and search to locate a specific UAV at any given time. A summary of the assigned task the UAV is completing would be shown, along with the ability for the user to tap into a live (or slightly delayed) feed of the data being collected by the UAV. This enables effective management of the entire system by a user, and facilitates quick and effective troubleshooting by enabling the rapid switching between macro- and micro-views of how the system is performing.

The cloud software may display the location of the UAVs on a variety of overlays corresponding to mapping layers which could be dynamically generated from a variety of external data sources. These overlays may include the state of UAVs on a GIS map, UAVs plotted in relation to the power transmission system, UAVs located in proximity to weather events or population centers, or other views of interest. The user could switch between or combine multiple views in order to generate a custom visual showing data of interest and UAV location at any time.

The user may also input tasks into the system—such as instructions to inspect portions of the transmission system. Tasks may take a variety of inputs including examples i) typing commands, ii) following a prompted wizard, iii) clicking on visual representations—e.g. selecting on a map, etc. Other means of inputting tasks may also be provided, including but not limited to gestures in virtual or augmented reality. Once the user inputs a high level task 601, the system automatically decomposes that task into UAV level tasks 602—choosing the number of UAVs required to complete a mission 606, 609-611, and assigning each UAV subtasks 613 that ensure the entire objective is met. This will involve managing the distribution of UAVs, assigning behavior based on charge status or health indications, and selecting sensor data to be captured. If a command is issued and the system does not have the resources available to complete it in the time window specified, the user will be notified that more resources will be required, and will be presented with an estimate of completion time given the current state of the system. If the user does not specify a time window, the system will estimate time required and display to the user.

The system shall keep track of any required logging information, using high or low speed storage with access times suited to the type of data, locally and in the cloud as required by law, procedures, regulations or specific instructions. The system may provide a means to accessing this data when prompted by a user. Access controls and authentication systems may be implemented to ensure that data can only be accessed by appropriate users and all attempts—successful or unsuccessful—to access data will be logged. Custom reports may also be specified to comply with newly developed requirements. These reports could be generated automatically on a continuous basis, in batches, individually per user request, or in another combination useful to the end user of the system.

When data is generated, the mapping overlays can be customized to show results and recommend next steps. For example, if data on vegetation encroachment is desired, the system can show the entire system and mark areas with imminent vegetation risks in red, near term vegetation risks in yellow, and far field vegetation risks in green. It can suggest and prioritize work, and even schedule crews if data is input, but it will require a human operator to decide on remediation plans.

The system may also allow the user to toggle between modes of behavior in the event of changes impacting large portions of the UAV network. For example, if the UAVs are in normal inspection mode and a fire is detected, the nearby UAVs can be toggled en masse to a continuous surveillance mode, while adjacent UAVs are evacuated for safety. UAVs could deploy their fire suppression equipment to remediate the fire, or could transmit POV information to firefighters or other first responders. While UAVs will normally act to protect themselves, this could be overridden so that some units are sacrificed in order to maintain as much surveillance of the incident as possible. Other UAVs could establish a perimeter and use signal generators to keep unwanted aircraft out of the area or speaker systems to broadcast messages to those on the ground.

FIG. 7 outlines an embodiment of process 700 for UAV 100 to use the signal outputs from electronic device 526 to develop a strategy to execute flight planning and sensor sweeps. What follows details an example for one iteration through the process cycle 700. 701 indicates the starting point for the process for autonomous UAV-based transmission line inspection. Data obtained from the sensor package 702, machine state 709 and external data 718 creates a virtual model 718 of the current local environment of the UAV 100. To do this, several data sources are sent to the CPU/GPU processor package 501 hardware and combined in the model synthesizing package software 713. These data sources may include digital signals from the sensor package 702, comprised of the digital signal output of an EMF sensor 703, LIDAR 704, infrared camera 705, stereo camera 706, GPS 707, and the output from sensor X and other sensors not listed 708, and digital signals from the current machine state 709 of UAV 100, comprised of the current state of the camera gimbals 710, motors 711, and the signal output from the current state of component Y and other components not listed 712.

Upon receiving these signal inputs, software package 713 works to create a model 718 of the UAV's current environment. This model 718 may further augmented by the inclusion of a dataset received from external resources 714. This dataset 714 may be retrieved from a cloud-based software package 717 for organizing motions and task of UAVs in the field via wireless signal 716 sent by long-range communication subsystem 715. Dataset 714 instructs model 718 of UAV 100 position both proximally and in regard to the current task status relative to other UAV 100 units in the field.

Upon creation of model 718, the on-board software package may combine the list of received tasks 719 with a set of automatically synthesized waypoint(s) 720 and feeds them into CPU/GPU based neural network 725. Neural network 725 then develops a series of flight 726-728 and sensor sweep 729-731 strategies.

The onboard processor 501 shall integrate this sensor data 503-512 and further fuse it with provided mapping information. This mapping information could include layers from geographic information systems, vectors representing power lines, nodes representing transmission towers, or other sources of information. Based on the combination of sensor data and mapping information, the processor shall identify objects and assign them to a category linked to inspection behavior. For example, objects could be classified as belonging to the system—different types of assets; they could be classified as external objects—vegetation, people, etc.; they could be classified as objects to be inspected—assets or vegetation; they could also be classified as objects to be avoided—other UAVs, people. Objects can have a one to many mapping with classifications, such that an object can have multiple classifications, either defined by a user or preprogrammed into the system.

Examples of automatic synthesis of waypoints 520 include identification of road and tree lines. If the primary objective for the UAV is to scan a length of power line, the process prioritizes placement of waypoints to optimize the quality of the sensor data collected. Optionally, a human operator can set macro waypoints, and the process 700 chooses the optimal route for navigating to waypoints.

The global navigation instructions of the UAV shall be composed into a one dimensional problem space—vector based directions that provide a heading for the UAV to navigate throughout the system. These vectors shall roughly correspond to transmission lines strung between towers, and so can adequately be represented by a single vector, changing directions only at nodes, or towers. The sequence of these vectors shall provide a path for UAV navigation. The UAV shall not necessarily have to construct this navigational plan on the unit—it can be sent from a hosted back end such that the UAV has to align it with observed mapping data. The UAVs shall navigate along the power lines in a manner analogous to cars on roads—they shall follow the power lines to either perform their inspections, or to reach the point at which an inspection must be performed.

Local navigation in three dimensions shall be performed by the processor using acquired sensor data in real-time. This navigation may include the UAV keeping at a safe distance from the power lines—maintaining a 200 ft separation, for example, local object avoidance (birds or other UAVs), human avoidance (cars or people), compensation for wind or weather, etc. Different sensor data shall be used to accomplish these tasks—maintaining separation from the power lines could rely on a combination of EMF 512 and LIDAR 504 data. Avoiding people could rely on IR 505 data. Station keeping could compare positions with GPS 507 information. Local autonomy may be as simple as slight adjustments to position, or as complicated as deciding not to cross a street when humans are detected based on flight strategies 726-728.

As a result of the neural network calculations, a series of n path planning processes 722-724, where n can be at least 1, desirably at least 10, and preferably at least 25, may then fed into neural network to generate n flight strategies 726-728, n sensor sweep strategies 529-531, where n can be at least 1, at least 10, or preferably at least 25. For example, scanning the vegetation around the power lines to create a 3D model is a key objective, the neural network identifies how many vantage points are needed to construct the model and determines the shortest path and outputs a series of vectors representing speed and direction to arrive at those points. The neural network produces a dynamically created decision tree useful for UAV operations.

The result of running process 700 through one cycle generates the next flight and sensor sweep actions of UAV 100. These aggregated data may be updated to cloud-based software package 717 via wireless signal 716 sent by long-range communication subsystem 715, as described in more detail in FIG. 6. Process 700 then repeats the cycle to further inform the autonomous action of UAV 100.

The embodiments described above illustrate various non-limiting examples of implementation. Those having ordinary skill in the art will recognize that various modifications and combinations may be made without departing from the scope and spirit of the invention, which is defined in the appended claims.

The invention claimed is:

1. A method, comprising:
accepting an instruction to deploy a collection of unmanned aerial vehicles (UAVs) to surveil a power grid section;
deploying the UAVs from locations within or proximate to the power grid section, the locations fixing the UAVs in place until after the instruction to deploy is accepted; and
receiving data from one or more sensor packages of the UAVs, the data comprising surveillance data related to the power grid section;
wherein the UAVs coordinate with one another to surveil the power grid section using semi-autonomous or fully autonomous flight.

2. The method of claim 1, comprising using the data from the one or more sensor packages to provide reactive three-dimensional autonomy for collision avoidance.

3. The method of claim 1, wherein the receiving comprises collecting image data for use in navigation.

4. The method of claim 3, wherein the image data comprises computer vision data and thermal data; the method comprising combining the computer vision data and the thermal data to detect a person or vehicle, and choosing a navigation strategy that avoids or minimizes overhead flight with respect to the person or vehicle.

5. The method of claim 1, wherein the receiving comprises associating light detection and ranging (LIDAR) data, visual image data, and electromagnetic field data to identify objects, and communicating data associated with identified objects to coordinate actions of the UAVs.

6. The method of claim 1, comprising using a processor configured for integrating and fusing data of the one or more sensor packages, aligning the data of the one or more sensor packages into a layer of mapping, and providing global autonomy in one dimension to one or more of the UAVs.

7. The method of claim 1, comprising executing a routine triggered in response to an event of a detected failure, wherein the routine executes a controlled landing of one or more of the UAVs with complete power off in order to prevent damage to surroundings.

8. The method of claim 1, wherein the data from one or more sensor packages comprises global positioning satellite (GPS) information; the method comprising using the GPS information and mapping data to produce path planning for one or more of the UAVs that traverses nodes in a network.

9. The method of claim 1, wherein the deploying comprises actuating a lock at the locations.

10. The method of claim 9, comprising providing exchange of power and data signals with an external power or data network and the UAVs via the locations.

11. The method of claim 1, comprising automatically releasing fire suppression material of one or more of the UAVs, the fire suppression material configured to release and render an onboard component of the one or more of the UAVs inert.

12. The method of claim 11, wherein the fire suppression material comprises one or more of: aqueous salts designed to disable the onboard component; expanding foam that will encapsulate the onboard component; and chemicals that consume heat and oxygen, preventing thermal runaway events.

13. The method of claim 1, comprising communicating, via the UAVs, with one or more of a centralized server and peer UAVs, using one or more of a long distance communication system and a local communication system.

14. The method of claim 1, comprising:
accessing one or more database systems storing tasks defined by end users or standard procedures and a description of available UAVs of the UAVs with capability information; and
communicating the instruction to deploy to the UAVs.

15. The method of claim 14, wherein the deploying comprises distributing the UAVs depending on the tasks.

16. The method of claim 15, wherein the capability information comprises a status; and wherein the distributing the UAVs comprises routing, scheduling, and dispersal of the UAVs, taking into account a status of each UAV.

17. The method of claim 15, wherein each respective status indicates one or more of a battery life and component health data.

18. The method of claim 14, comprising using differences in the capability information to perform the deploying.

19. The method of claim 1, wherein to surveil the power grid section using semi-autonomous or fully autonomous flight comprises utilizing one of a plurality of operating modes.

20. The method of claim 19, wherein:
the operating modes correspond to a state of the power grid section under surveillance; and
wherein the operating modes include a normal operating mode wherein inspections are performed routinely, and an incident response operating mode wherein one or more UAVs are evacuated, and switched to intense local surveillance, or another operating mode.

* * * * *